Aug. 15, 1933.　　　　S. EVANS　　　　1,922,424
INDEXING DEVICE FOR WELDERS
Filed Jan. 10, 1929　　　3 Sheets-Sheet 1

INVENTOR
Seth Evans
BY Jesse R Stone
ATTORNEY

Aug. 15, 1933.   S. EVANS   1,922,424
INDEXING DEVICE FOR WELDERS
Filed Jan. 10, 1929   3 Sheets-Sheet 2

Seth Evans INVENTOR
BY Jesse R. Stone
ATTORNEY

Aug. 15, 1933.  S. EVANS  1,922,424
INDEXING DEVICE FOR WELDERS
Filed Jan. 10, 1929  3 Sheets-Sheet 3
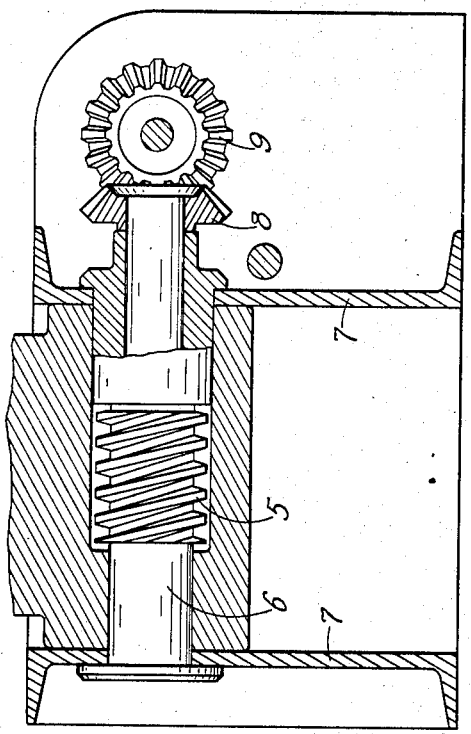
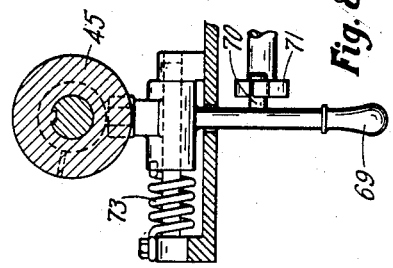
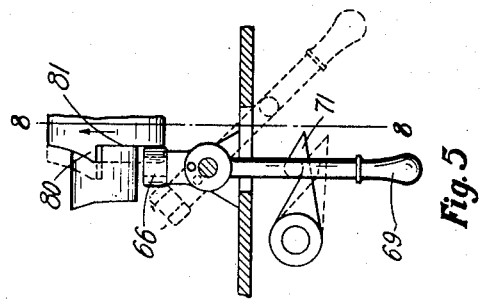
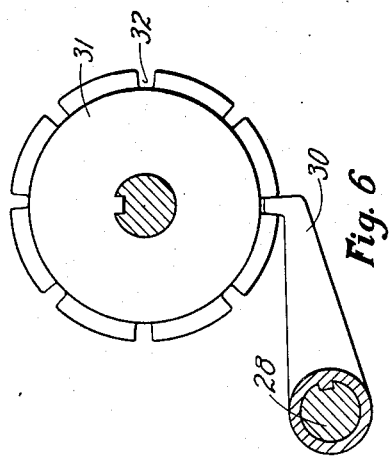
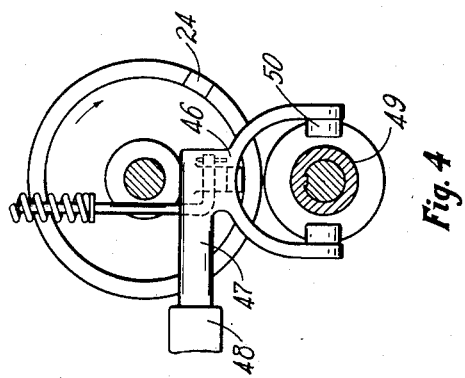
Seth Evans INVENTOR
BY Jesse R. Stone
ATTORNEY Patented Aug. 15, 1933

1,922,424

UNITED STATES PATENT OFFICE 1,922,424

INDEXING DEVICE FOR WELDERS

Seth Evans, Houston, Tex., assignor to Hughes Tool Company, Houston, Tex., a Corporation of Texas Application January 10, 1929. Serial No. 331,579

10 Claims. (Cl. 219—4)

My invention relates to welding machines and has particular reference to means for indexing the member upon which teeth or similar parts are to be welded.

The device is designed particularly for use in the automatic welding of rows of teeth upon a cutter body where the position of the rows of teeth on the cutter and of the teeth in the rows has been previously calculated and determined.

It is an object of the invention to provide a machine for operation with a welding device of the character set out in my co-pending application No. 290,457, filed July 5, 1928, since matured into Patent Number 1,830,649, dated November 3, 1931 and which will serve to index and position the cutter body for the welding thereto of the successive rows of teeth and to stop the operation thereof when the cutter is complete.

In the operation of the device the teeth must be welded accurately in position at a rapid rate without adjustment by the operator and I aim to provide a machine which will require but little care or attention in operation and which will accurately position the cutter body for the welding operation.

The invention resides in the particular form and arrangement of the parts making up the device and attention is directed to the showing thereof in the drawings where Fig. 1 is a side view in vertical section through the main indexing elements.

Fig. 4 is a transverse section taken on the plane 4—4 of Fig. 1.

Fig. 5 is a view illustrating the working of the control lever shown in Fig. 1.

Fig. 6 is an enlarged section taken on the plane 6—6 of Fig. 1.

Fig. 7 is a broken view showing the arrangement of the cutter rotating device.

Fig. 8 is a sectional view taken on the plane 8—8 of Fig. 5.

Like numerals of reference are employed to designate like parts in all the views.

Figure 1:
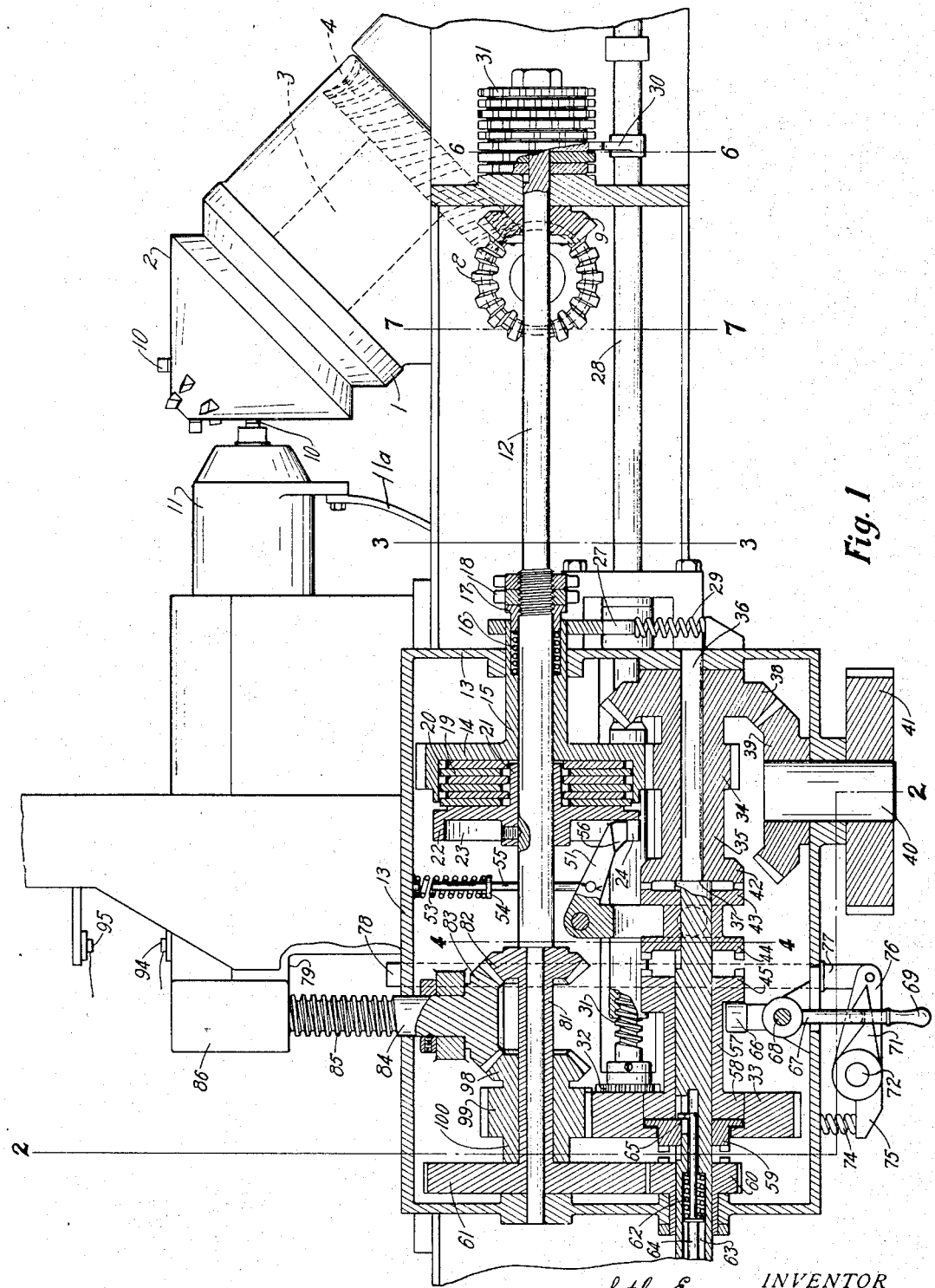

My indexing device is employed with a cutter supporting member having a head 1 upon which the cutter body 2 may be detachably mounted. This cutter support is connected with a shaft 3 upon which is a worm gear wheel 4 adapted to engage with a worm gear 5 formed upon a shaft 6 supported for rotation in the frame 7, as shown in Fig. 7. Said shaft 6 has a bevel gear 8 thereon at one end whereby rotation may be communicated thereto through gear 9 to be later described. The rotation of the gear body is preferably intermittent so as to bring the surface of the conical body in proper position to receive the teeth 10 to be welded thereto from the welding device shown generally at 11. The proper rotation and positioning of the conical cutter body 2 to receive the teeth 10 is the purpose of my invention, which will now be described.

The gear 9 which connects with gear 8 is mounted upon a shaft 12 supported in the frame and extending into a gear housing 13 in which the larger part of the operating mechanism is located. Within said housing a clutch actuating gear is rotatable on said shaft. It has a sleeve shaped hub 15 thereon extending through said housing. The outer end of said hub sleeve is recessed to receive a coiled spring 16 placed under compression by a gland-shaped nut 17 threaded upon said shaft and held in position by lock nuts 18.

Said spring tends to hold said gear 14 resiliently toward the disc clutch members 19 housed in the cupped recess 20 in said gear. Said discs are mounted upon the hub 21 of a plate 22 fixed to the shaft by a set screw or other means. The inner face of said plate has a friction surface presented toward said friction clutch members. The other side of said plate is cupped to provide an axially extending flange 23 which has a pawl receiving notch 24 therein.

Figure 3:
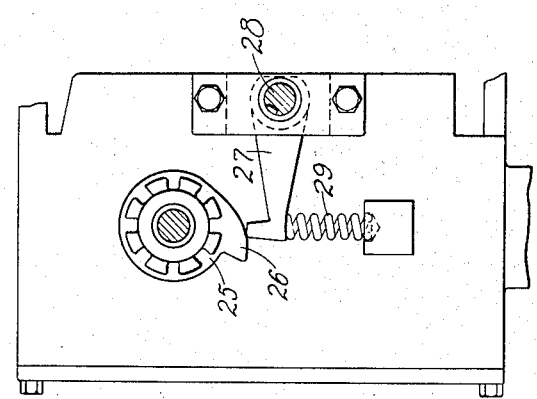
Fig. 3 is a detail taken on the plane 3—3 of Fig. 1.

Mounted on the hub 15 of the gear 14 is a cam plate 25 shown best in Fig. 3. It has a cam 26 at one side adapted to depress a finger 27 on shaft 28 at each revolution of the gear 14. Said finger is held resiliently against said cam by spring 29. The finger 27 is keyed to slide on the shaft which is rotatable in the supporting frame. The shaft has a pawl 30 adjacent its forward end and its rearward end is enlarged and provided with a threaded bore to receive the screw 31 by means of which the said shaft 28 may be moved longitudinally in its bearing. Said screw 31 has a gear 32 thereon adapted to mesh with a gear 33 which will be later described.

The pawl 30 co-operates with a plurality of notched discs 31 each of which has the notches 32 therein spaced a predetermined distance apart. There are as many discs 31 as there are rows of teeth on the cutter 2 and each disc is brought in succession into co-operation with the pawl 30. The discs are mounted on shaft 12 and the pawl is moved from one disc to the next by the movement of shaft 28 by means of screw 31.

The gear 14 is rotated through engagement with gear 34 formed on sleeve 35 mounted on shaft 36, secured rotatably in the housing 13. The shaft 36 is enlarged at 37 and is extended beyond the housing for connection with some source of power, not shown. The sleeve 35 has the bevel gear 38 at one end, said gear engaging a similar gear 39 mounted upon the stub shaft 40 extending downwardly through the housing and having the crown gear 41 on the lower end thereof below said housing. The other end of the sleeve 35 has a dental clutch member 42 thereon to be engaged by the slidable clutch member 43. Said clutch 43 has a clutch face 44 on its opposite end to engage with a co-operating clutch member 45 mounted on the shaft 36, but rotatable on said shaft. The clutch 43 is splined slidable to the shaft but non-rotatable thereon.

The clutch member 43 not only serves the purpose of connecting the gear sleeve 35 and the clutch 45 to the shaft, but also serves to actuate the pawl 51 previously referred to. This last function is accomplished through a forked arm 46, seen best in Fig. 4, which is mounted upon a shaft 47 supported for rotation in a bearing block 48 in the side wall of the housing. The arm 46 is formed, as previously noted, to straddle the central recessed portion 49 of the clutch 43. It has inwardly projecting studs 50 which fit loosely within the central groove or recess in the clutch. The pawl 51 is formed upon the upper end of the arm 46 and extends laterally to rest against the inner face of the flange 23 of the plate 22. It is held resiliently in contact with said flange by means of a spring 53 engaging at its upper end against the housing 13 and at its lower end against a plate or washer 54 upon a rod 55 pivotally connected with the said pawl 51. A forward finger 56 on the pawl is adapted to engage within the notch 24 in the flange when said notch rotates to a position below said finger. It will be noted that when the clutch 43 is moved to the right it will tend to raise the finger 56 out of the notch, but when in neutral position or when moved toward the left, the pawl tends to engage with the flange of the plate 22.

The clutch member 45 is formed upon a sleeve 57 rotatable on the shaft 36 and having at its outer end a radial flange 58 which is rigidly engaged with the interior of a gear 33. This engagement is usually accomplished by shrinking the gear over the flange 58 and from our standpoint the gear is integral with the flange 58. This arrangement for forming the gear allows the inclusion at the end of the sleeve 57 and within the outer margin of the gear 33 a clutch member 59. The teeth on said clutch are adapted to engage with similar teeth upon a gear 60 mounted in the wall of the housing and adapted to communicate rotation to a gear 61 mounted on the outer end of the shaft 12, previously referred to. It is to be noted that the sleeve 57 and the two clutch members 45 and 59, together with the gear 33, are movable longitudinally as a unit on the shaft 36. The sleeve 57 with the clutches and gears thereon is normally held resiliently outwardly to engage the clutches 59 and 60 by means of a spring 62, housed within the outer end of the shaft 36 in a recess 63 therein and exerting an outward thrust upon a rod 64 extending axially inward from said recess and having a finger 65 thereon, projecting through a slot in the side of the shaft and engaging against a shoulder on the inner side of the clutch member 59.

It is to be noted that the clutch member 59 is splined slidably to the shaft, and is rotatable independently of the gear 33 as will be later described.

The sleeve 57 is normally held against movement outwardly by means of a roller 66 formed upon the inward end of an arm 67, which is pivoted to swing upon a stub shaft 68 on the lower wall of the housing. The arm 67 projects below the pivot 68 through the wall of the housing and has at its lower end a handle 69. The construction of this lever is shown best in Figs. 5 and 8. The lower end of the arm 67 has a laterally extending pin 70 thereon which is adapted to be engaged by a latching arm 71. Said arm is secured rigidly to a short shaft 72 so that when said shaft is rotated the latch may be moved away from the pin 70 so as to release the same. A spring 73 on the shaft 68 tends to swing the arm 69 to the right of the position shown in full lines to the dotted line position indicated in Fig. 5. Also the latch member 71 is held resiliently in engagement with the pin 70 by means of the spring 74, bearing against the housing at its upper end and against an arm 75 at its lower end, said arm being formed on the hub of latch member 71, as indicated in Fig. 1. There is a second arm 76 on the shaft 72, which is offset relative to the latching arm 71 and is pivoted at its outer end to the lower extremity of a bar 77. This bar, as indicated in dotted lines in Fig. 1, extends upwardly at one side of the housing, and projects at 78 above the housing in position to contact with a shoulder 79 of the welding device, as will be later noted.

The side of the clutch member 45 which is engaged by the roller 66 upon the arm 67 is cam-shaped, as shown best in Fig. 5. The rotation of the sleeve 57, carrying with it the clutch member 45, will move the cam shoulder 80, indicated in Fig. 5, under the roller 66 and will thus tend to force the sleeve 57 to the right of the position shown in Fig. 1. Following this movement of the sleeve and the clutch, the roller will pass over the cam member 80 and drop against the level face 81 in the position shown in the drawings.

The rotation of the gear 61 through its connection with the gear 60 will cause the rotation of the sleeve 81 mounted on the reduced outer end of the shaft 12. Said sleeve has at its inner end a bevel gear 82 thereon engaging with a similar gear 83 upon the vertically extending shaft 84. This shaft is formed with a coarse thread 85 at its upper end, said thread being adapted to screw within a sleeve or nut 86 upon the frame of the welding device. This welding device forms no part of the present invention but it will be noted from Fig. 2 that the frame indicated at 87 is connected rigidly with the nut or block 86 and is adapted to slide vertically in uprights 88 so as to raise and lower the welding mandrel 11 previously referred to. Downwardly extending shaft 89 keyed within a sleeve 90 allows rotative movement to be communicated to the advancing mechanism, not shown. This rotative movement is communicated to the sleeve portion 90 of the shaft through gear 92 at its lower end operatively connected with the gear 41 by means of an idler pinion 93. At the upper end of the frame 87 is a terminal 94 of the motor circuit and a similar terminal 95 above the terminal 94 may be engaged with the lower terminal when the frame 87 has been sufficiently elevated.

The rotation of the shaft 84 in one direction will raise the welding frame and when rotated in the opposite direction said frame will be lowered. This opposite rotation is accomplished through gear 98 mounted upon a gear sleeve 100. Said sleeve has thereon the gear 99 meshing with the gear 33 previously described. Said gear sleeve 100 and its gears rotate about the sleeve 81 of the gear 61.

In the operation of this device, it is to be understood that it is timed to operate with the welder, the forward end 11 of which is advanced at intervals to electrically weld a tooth 10 to the surface of the cutter. The mandrel 11 forms one electrode by connection with the electric conductor 11ª, and the cutter body 2 is understood as also connected with the opposite terminal, not shown. The welder forms no part of the present invention and need not be further described. As the welder is withdrawn, the cutter body is rotated a suitable amount to receive the next tooth at the proper point on the cutter surface. As one row of teeth has been completed, the welder is depressed to start another row of teeth.

The shaft 36 is constantly rotated when the motor is operated. When the welder frame is elevated to its upper limit, the motor circuit is cut off by the contact of posts 94 and 95. When these terminals are separated the motor is operated. The device is started with the clutch 43 engaged with the sleeve 35 and the finger 56 of the pawl 51 riding on the flange 23. The gear 14 will be rotated carrying with it, the cam 26, and, as the rotation of the plate 22 is prevented through the locking of the shaft 12 by means of the pawl, 30, engaging with one of the discs 31, the friction clutch 20 will slip until the cam 26 depresses pawl 27, thus rotating shaft 28 to throw the pawl 30 out of its notch in the disc 31, allowing the shaft to rotate under the action of the friction clutch 20. The pawl 27 drops off the cam 26 at once leaving the pawl 30 resting on the periphery of the disc 31, so that it will drop into the next notch that is brought below it by the rotation of the shaft 12. The shaft 12 will be then stopped and the friction clutch will slip until the pawls are again raised. This action will continue until the shaft 12 has been completely rotated during which time, the cutter body 2 will have been completely rotated and a complete row of teeth welded thereon.

To lower the welder 11 one notch and start a new row of teeth, and to simultaneously shift the pawl 30 to the disc 31 having the proper number of notches to accommodate the new row of teeth, the finger 56 is arranged to engage notch 24 as the complete rotation of shaft 12 has been completed. The dropping of pawl 51 throws clutch 43 to the left in Fig. 1, releasing sleeve 35 and engaging sleeve 57, the rotation of which moves gears 99 and 32. The rotation of gear 99 rotates gear 83 and screw 84 to screw the welder downwardly. The rotation of gear 32 rotates screw 31 to move the shaft 28 and pawl 30 sufficiently to bring pawl 30 against the next adjacent disc 31. It should be noted that the pawl 51 drops to stop the rotation of shaft 12 after the pawl 27 has been raised to release the pawl 30, so that the pawl 30 is thereby free to move laterally with the longitudinal movement of shaft 28.

The rotation of sleeve 57 carries with it the cam 80 so that one rotation of said sleeve brings the said cam against the roller 66 and the sleeve 57 is thereby moved to the right in Fig. 1 moving clutch 43 also over to engage the sleeve 35 which starts to rotate bringing the flange 23 beneath the finger 56 which has been raised by the movement of the clutch 43. The cam 80 has then passed the roller 66 and the spring 62 throws the sleeve 57 back against the roller 66 and rotation of said sleeve is stopped. The single rotation of the gear 33 thus accomplished is sufficient to screw the shafts 85 and 31 the proper amount to position the welder and the pawl 30 respectively at the proper points for a repetition of the operations just described.

Figure 2:
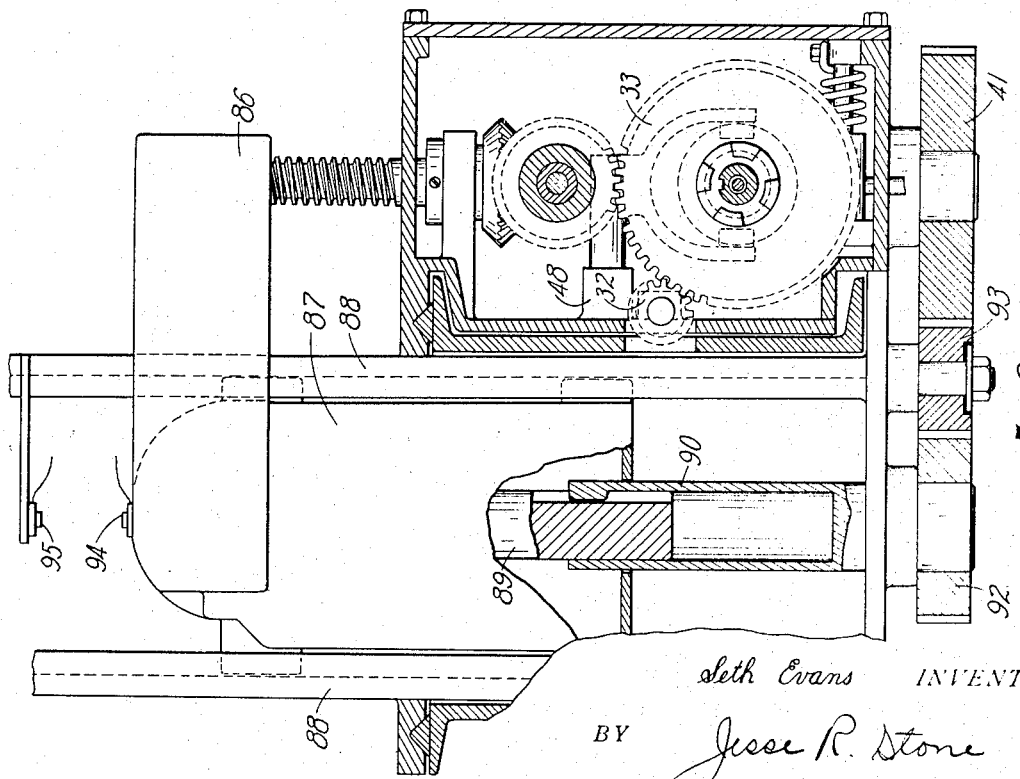
Fig. 2 is an end view of the machine taken on the plane 2—2 of Fig. 1.

The timing of the indexing device and the welder is brought about through the gear 41, operated through connection with gear 38 as previously set out. The gear 41 operates gear 92 to move the welder as shown in Fig. 2.

When the rows of teeth on the cutter have been completely welded in position, the downward movement of the welder frame will bring the shoulder 79 thereon against the bar 78, forcing it downwardly and rotating the shaft 72 by means of the arm 76. This will depress the latch finger 71, releasing the arm 67 which will be thrown by spring 73 into the dotted line position of Fig. 5, thus releasing sleeve 57. This will occur when the clutch 43 has been moved by the dropping of the pawl 51 into the notch 24 and rotation will thereby be communicated to sleeve 57 which will be started rotating to screw the welder frame downwardly; this will assure the moving of bar 78 to release the arm 67 and roller 66 so that the spring 62 can move the sleeve 57 and gear clutch member 59 to engage the gear 60. The sleeve 57 will be thereby released from clutch 43 which will be then in a neutral position.

The rotation of inserted clutch member 59 will then be communicated to the gear 60 while the gear 33 will be free to idle on the shaft. The gear 60 will actuate gears 61, 82, and 83 to screw the shaft 85 in a direction to raise the frame 86 and eventually bring the posts 94 and 95 together to cut off the current and stop the motor and the machine.

The operator will then remove the cutter 2 and place another blank in position and then throw the lever 67 back to the full line position where it may be engaged by the latching arm 71 and there held. When the gear 83 is rotated to raise the welding frame, rotation is communicated through gears 98, 99, 33 and 32 to screw shaft 28 back and bring the pawl 30 opposite the first of the discs 31, whereby the number of teeth in the first row on the cutter may be regulated. The movement of lever arm 67, so as to bring the roller 66 against the cam face of the end 45 of the sleeve 57 serves to withdraw said sleeve to release the engagement between clutch member 59 and gear 60. The device is then ready to begin its operation over again in the same sequence as before.

The device thus constructed is adapted to operate automatically to keep the cutter body 2 in position to receive the teeth which are welded thereto. When the device has been set, the cutter will be completed and the machine stopped before it will need the attention of the operator. The positioning of the teeth on the cutter will be accurately accomplished.

What I claim as new is:

1. In a welding device for operation upon a conical cutter body, means to support said body, and means to weld teeth thereon, the combination of means to periodically communicate a rotative movement to said body, automatic means connected with said rotative means to index said body to receive said teeth, means to move said welding means longitudinally along the work, and means to stop said device when said teeth have been applied to said body.

2. A welding device including a support for a conical cutter body, means to periodically rotate said support, means to weld teeth upon said body, means to move said welding means vertically for each row of teeth, and means connected with said rotative means to index said support and cutter body to receive said teeth, and means to reverse the vertical movement of said welding means when said cutter teeth have all been applied.

3. A welding device including a support for a conical cutter body, means to periodically rotate said support, means to weld teeth upon said body, means to move said welding means vertically for each row of teeth, and means connected with said rotative means to index said support and cutter body to receive said teeth.

4. A welding device including a support for a conical cutter body, means to periodically rotate said support, means to weld teeth upon said body, means to move said welding means vertically for each row of teeth, and means connected with said rotative means to index said support and cutter body to receive said teeth, and means responsive to the vertical movement of said welding means to reverse said movement when the last row of teeth has been completely welded.

5. In a welding device a support for conical cutter body, means to weld teeth upon said body, means to rotate said support and body intermittently, means connected with said rotating means to index said body to receive said teeth, means to automatically shift said welding means when one row of teeth has been completed, and means to return said welding means to its initial position when the last row of teeth has been welded.

6. In a welding device, a support for a conical cutter body, means to weld teeth upon said body, means to rotate said support and body intermittently, means connected with said rotating means to index said body to receive said teeth, means to automatically shift said welding means when one row of teeth has been completed, and means to return said welding means to its initial position when the last row of teeth has been welded, and means to stop said device when said welding means reaches its initial position.

7. In a device of the character described including a rotatable support for an approximately conical cutter body and a welding device for welding cutter teeth on said body, the combination of means to rotate said work support intermittently, means to index said body to receive said teeth, means to automatically adjust said welding device relative to said body, means to return said welding device to its initial position when said teeth have been welded, and means responsive to the return of said welding device to its initial position to stop said device.

8. In a device of the character described, a rotatable support for a conical body, an operating device adapted to act on the surface of said body, means to rotate said body, an indexing device to hold said body in successive positions to be acted upon, means to adjust the position of said operating device, until said body has been entirely acted upon, and means to automatically return said operating device to its original position.

9. In a device of the character described, a rotatable support, for a conical body, an operating device adapted to act on the surface of said body, means to rotate said body, an indexing device to hold said body in successive positions to be acted upon, means to adjust the position of said operating device in successive vertical stages, until said body has been entirely acted upon, and means to automatically return said operating device to its original position.

10. A device of the character described including a support for a conical cutter body, welding means to weld teeth in rows around said body, means to rotate said support by steps to bring successive areas of said cutter body adjacent said welding means to receive said teeth, and means to adjust said welding means to position it properly for the various rows of teeth.

SETH EVANS.